United States Patent
Louis

[19]

[11] Patent Number: 5,979,793
[45] Date of Patent: Nov. 9, 1999

[54] SELF-CONTAINED MISTING DEVICE

[76] Inventor: R. J. Louis, 5474 Round Meadow Rd., Hidden Hills, Calif. 91302

[21] Appl. No.: 08/869,229

[22] Filed: Jun. 4, 1997

[51] Int. Cl.⁶ ..................................................... B05B 15/00
[52] U.S. Cl. .......................... 239/128; 239/146; 239/289; 239/332; 222/146.6; 135/16; 4/615
[58] Field of Search .............................. 239/99, 128, 332, 239/67, 68, 146, 273, 276, 279, 280, 289, 302, 525; 62/312, 304, 337, 338, 506; 135/16; 297/188.08–188.13, 180.15; 4/602, 603, 615, 616; 222/146.1, 146.6

[56] References Cited

U.S. PATENT DOCUMENTS

| | | |
|---|---|---|
| 542,661 | 7/1895 | Thielemann . |
| 2,674,491 | 4/1954 | Schurtz ................................ 239/128 X |
| 2,727,366 | 12/1955 | Hagen . |
| 3,625,434 | 12/1971 | Kitover . |
| 4,204,612 | 5/1980 | Schrader et al. ..................... 239/128 X |
| 4,765,542 | 8/1988 | Carlson . |
| 4,789,100 | 12/1988 | Senf ...................................... 239/68 X |
| 4,846,525 | 7/1989 | Manning . |
| 4,854,502 | 8/1989 | Cox . |
| 4,871,141 | 10/1989 | Chen . |
| 4,925,099 | 5/1990 | Owen . |
| 5,000,384 | 3/1991 | Arnold . |
| 5,024,065 | 6/1991 | Barrett ................................... 62/337 X |
| 5,029,758 | 7/1991 | Chayer ................................ 239/280 X |
| 5,143,107 | 9/1992 | Kelley . |
| 5,143,108 | 9/1992 | Kenney . |
| 5,207,238 | 5/1993 | Rivera et al. . |
| 5,299,588 | 4/1994 | MacLeod .................................. 135/16 |
| 5,322,023 | 6/1994 | Hammond . |
| 5,322,342 | 6/1994 | Gange . |
| 5,390,852 | 2/1995 | Schuenemann et al. ........... 239/332 X |
| 5,560,219 | 10/1996 | Vegara ................................. 62/312 X |
| 5,613,731 | 3/1997 | Aspinall . |
| 5,678,771 | 10/1997 | Chapman .............................. 239/99 X |

FOREIGN PATENT DOCUMENTS 4112729  4/1992  Japan ..................................... 239/128

Primary Examiner—Andres Kashnikow
Assistant Examiner—Steven J. Ganey
Attorney, Agent, or Firm—Blakely, Sokoloff, Taylor & Zafman, LLP

[57] ABSTRACT

A misting device is provided. The misting device includes at least one nozzle configured to spray a fluid. The misting device also includes a conduit configured to supply the fluid to the at least one nozzle. The conduit has a first end coupled to the at least one nozzle. The conduit has a second end that communicates with a fluid compartment of a base housing included in the misting device. The base housing includes a pressure providing device that communicates with the fluid compartment. The pressure providing device is configured to cause the fluid to flow to the at least one nozzle via the conduit. The base housing further includes a cooling compartment adjacent the fluid compartment. The cooling compartment is configured to cool the fluid.

17 Claims, 4 Drawing Sheets

SELF-CONTAINED MISTING DEVICE

BACKGROUND OF THE INVENTION

1. Field of the Invention

The present invention relates to misting devices. Particularly, the present invention relates to self-contained misting devices.

2. Description of the Related Art

Misting devices have been used for years in connection with different applications. One application of misting devices provides a way of cooling off or refreshing individuals (users) outdoors when hot. Typically, in a misting device a fluid, such as water, is fed to one or more nozzles that spray the water in a mist in a direction where a user may stand, sit or lay. One problem with these misting devices is that many of these devices are not self-contained. The water is typically fed to the misting device from a reservoir located remotely from the misting device and/or the misting device is not transportable, i.e. is fixed to a given location. This limits the mobility of the misting device, and implicitly of the users who are prevented from freely moving outdoors wherever they desire still being able to use the misting device. It is desirable to provide a misting device that is self-contained such that users may easily transport it from one place to another at distances where the use of a power cord and/or a feedline for feeding water to the misting device would be cumbersome if not impossible.

Moreover, often, during hot days, the refreshing effect of the mist dispensed by a misting device may be outweighed by the fact that the water to be dispensed is held at the environment's temperature which may be relatively high. The warmer the temperature of the water dispensed by a misting device, the less enjoyable is the effect of the mist. Accordingly, it is desirable to provide a misting device that is endowed with cooling down the water dispensed. Additionally, it is desirable to provide a self-contained misting device that is multi-functional and may be utilized in connection with a table and an umbrella mounted thereto and for holding refreshments such as foods and beverages.

BRIEF SUMMARY OF THE INVENTION

The present invention provides a misting device that includes at least one nozzle configured to spray a fluid. The misting device also includes a conduit configured to supply the fluid to the at least one nozzle. The conduit has a first end coupled to the at least one nozzle. The conduit has a second end that communicates with a fluid compartment of a base housing included in the misting device. The base housing includes a pressure providing device that communicates with the fluid compartment. The pressure providing device is configured to cause the fluid to flow to the at least one nozzle via the conduit. The base housing further includes a cooling compartment adjacent the fluid compartment. The cooling compartment is configured to cool the fluid.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, numerous specific details are set forth to provide a thorough understanding of the present invention. However, one having ordinary skill in the art should recognize that the invention may be practiced without these specific details. In some instances, well-known elements, structures, and techniques have not been shown in detail to avoid obscuring the present invention.

Figure 1:
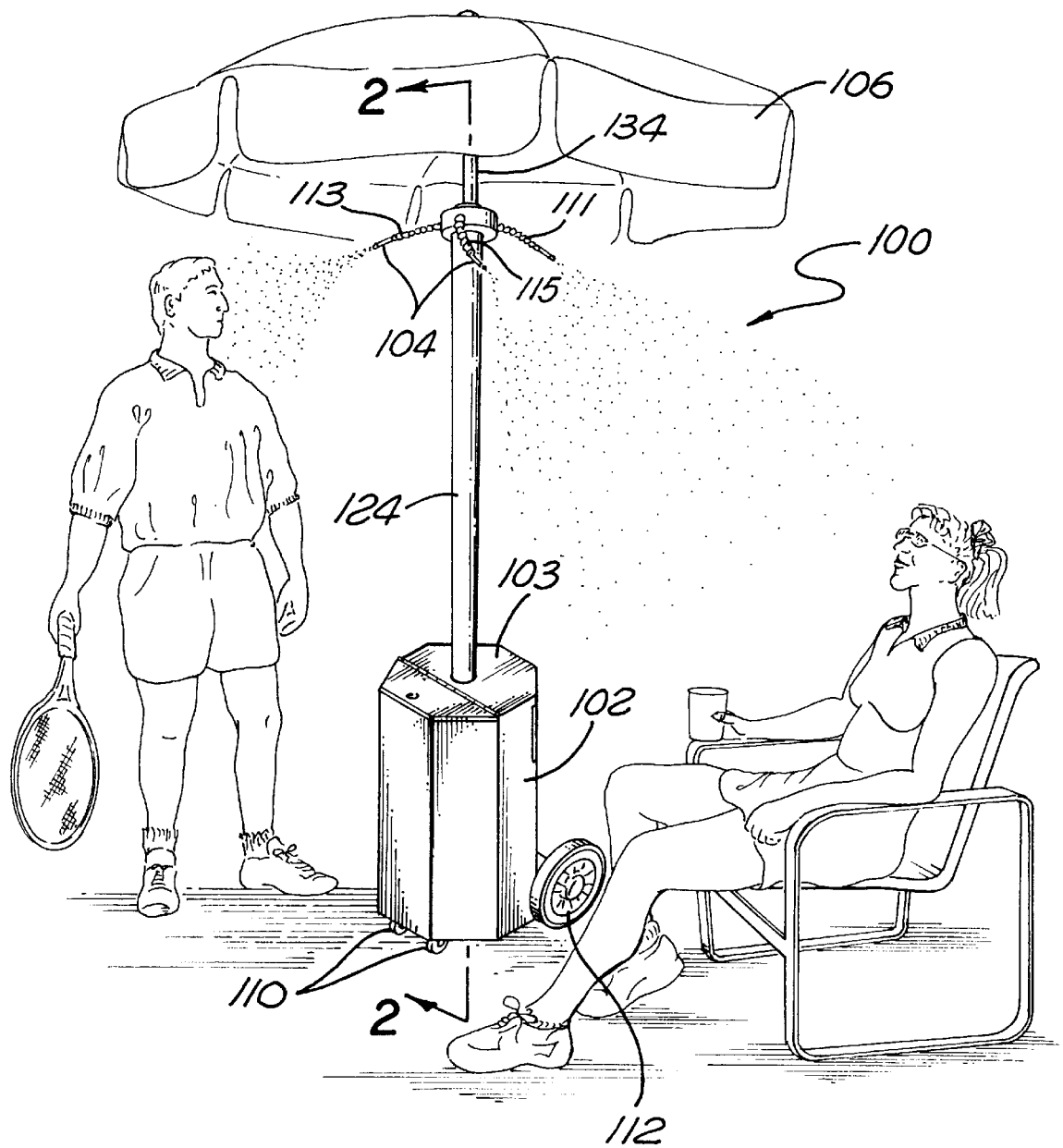
FIG. 1 illustrates a perspective view of a misting device according to the present invention.

FIG. 1 illustrates a perspective view of a misting device 100 according to the present invention. Misting device 100 shown in the figure may be used for cooling off tennis players. The use of misting device 100 shown in FIG. 1 is only illustrative and non-limiting, being understood that misting device 100 may be used in other contexts. For example, misting device 100 may be placed in a backyard of a house with a table platform mounted onto a top surface 103 of base housing 102, or it may be used at the beach or by a swimming pool.

Misting device 100 is designed to spray water or other fluids in a mist form via nozzles 104. In one embodiment according to the present invention shown in FIG. 1, misting device 100 includes three nozzles 104 configured to spray the water. Water is typically fed to nozzles 104 via a conduit (not shown) which passes through a hollow interior of post 124. Misting device 100 has a base housing 102 that includes a fluid compartment that communicates with the conduit and holds water to be dispensed. The base housing 102 also includes a pressure providing device, such as a pump, that drives the water upwardly via the conduit causing water to flow to nozzles 104. An umbrella 106 may be mounted to the misting device 100 by way of umbrella shaft 134 to protect users against the sun. Misting device 100 is mobile and is provided with transport means. The transport means includes two swivel casters 110 and two wheels 112 which afford the possibility of easily transporting misting device 100 to different locations.

Figure 2:
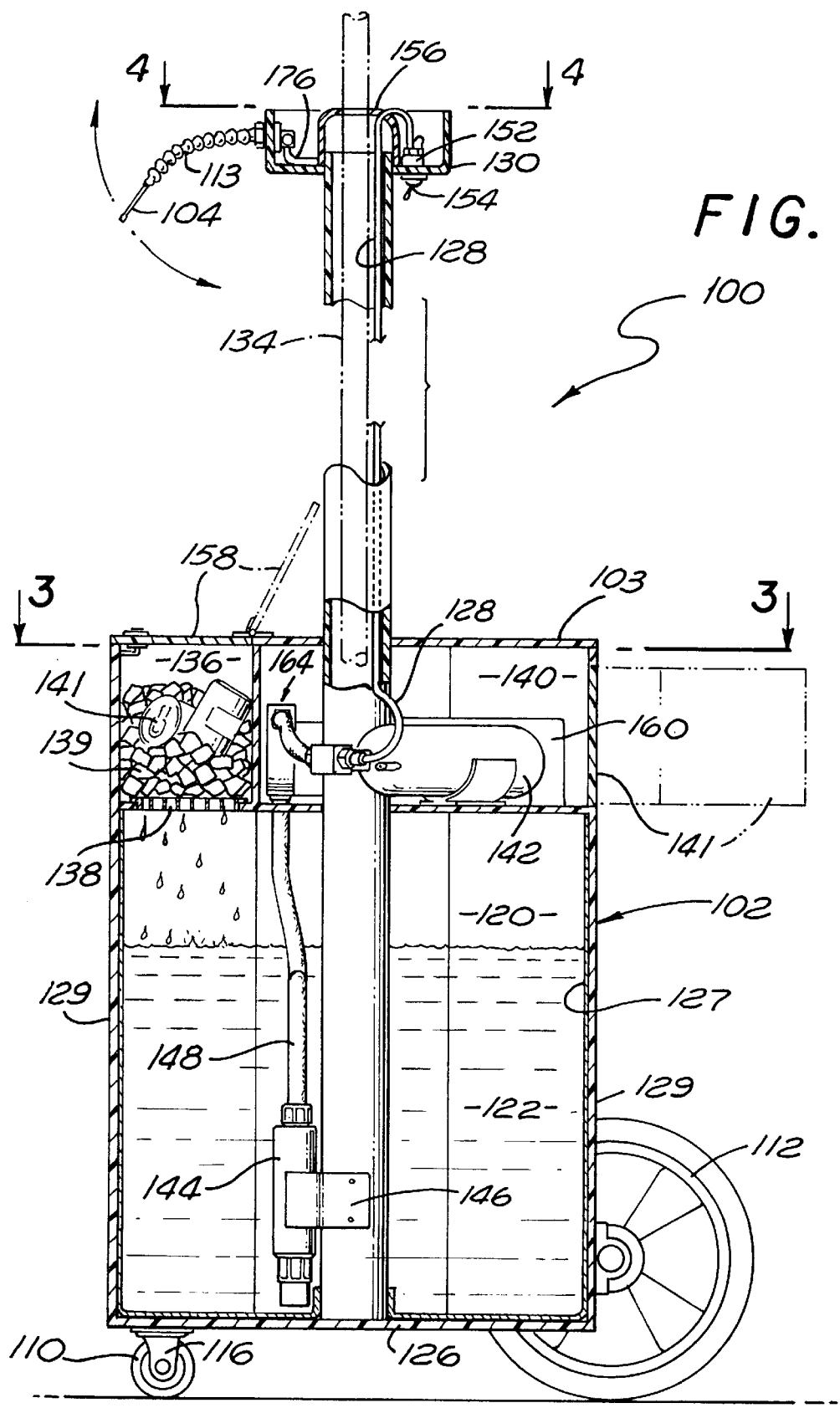
FIG. 2 illustrates a cross-sectional view taken along line 2 of FIG. 1 of a misting device according to the present invention.

FIG. 2 illustrates a cross-sectional view of misting device 100 taken along line 2 of FIG. 1. Misting device 100 includes a base housing 102 that may be made of plastic by way of non-limiting example, although other materials may be used. While the base housing 102 is shown in FIG. 1 as being octagonal, base housing 102 may have any other convenient shape. Misting device 100 may be transported by way of two swivel casters 110 (of which only one is shown) which are mounted at a bottom of base housing 102. Swivel casters 110 may be turned 360° relative to a vertical axis that passes through the center of these casters. The base housing 102 also has mounted thereto a pair of wheels 112 (of which only one is shown) spaced apart from swivel casters 110.

Base housing 102 includes a fluid compartment 120 that contains a fluid 122 to be misted. In one embodiment according to the present invention, the fluid to be misted is water. Fluid compartment 120 has an inner impermeable liner 127 that prevents water to be spilled out of the fluid compartment 120 if the outer walls 129 of the fluid compartment 120 are pierced. A cylindrical post 124, that has a hollow interior, is mounted to base housing 102 at a bottom surface 126 thereof. Post 124 upwardly extends from bottom surface 126 and encloses therein conduit 128, which extends to a cup-shaped hose router 130. Hose router 130 routes hose 176 to a flex tube 113 which has nozzle 104 mounted at a free end thereof. While only one hose 176, one flex-tube 113 and one nozzle 104 are shown in the figure, the misting device 100 according to the present invention includes more such structures. Hose router 130 has a toggle valve 152 mounted thereto by way of which water delivery to hose 176 and thereby to nozzle 104 may be stopped when toggle valve 152 is turned off.

Optionally, post 124 may enclose umbrella shaft 134 that upwardly extends through post 124 above hose router 130. A canopy (not shown in this figure, but shown in FIG. 1) may be mounted to a free (upper) end of umbrella shaft 134. Hose router 130 includes a dome-shaped end cap 156 that has at a lower part thereof an opening that frictionally engages post 124. At an upper part thereof end cap 156 has an aperture 153, made through its center, configured to pass therethrough umbrella shaft 134. A diameter of aperture 153 is slightly larger than a diameter of umbrella shaft 134 to hold shaft 134 without permitting substantial rattling. End cap 156 also includes a second aperture 157, positioned eccentrically, that permits conduit 128 to pass therethrough and to be fed to toggle valve 152.

Base housing 102 also includes a cooling compartment 136. The cooling compartment 136 may be filled with ice cubes 139 for chilling foods and beverages 141. Cooling compartment 136 includes a grill 138 with openings that allow cold water dripping from ice cubes 139 to drop into water compartment 120 thereby cooling down the water 122. The cooling compartment 136 may be accessed by door 158 (shown in phantom lines) for inserting ice and foods and beverages.

Furthermore, base housing 102 includes a third compartment 140. Compartment 140 includes certain electromechanical units such as accumulator 142, a pressure providing device 166 and a battery 160 that supplies power to the pressure providing device 166. Conduit 128, is fed from accumulator 142 upwardly, drives water to hose router 130 under a pressure which is maintained by accumulator 142. Base housing 102 also includes a water filter 144, mounted by way of bracket 146 to post 124, for filtering the water and thereby avoiding clogging of nozzles 104. Water filter 144 filters the water 122 from compartment 120 before the water is fed upwardly via feedline 148 to the pressure providing device 166. Alternatively, water filter 144 may be placed after the pressure providing device 166. The third compartment 140 may be accessed via door 141 that opens laterally (as shown in phantom line) to permit access to the compartment.

Figure 3:
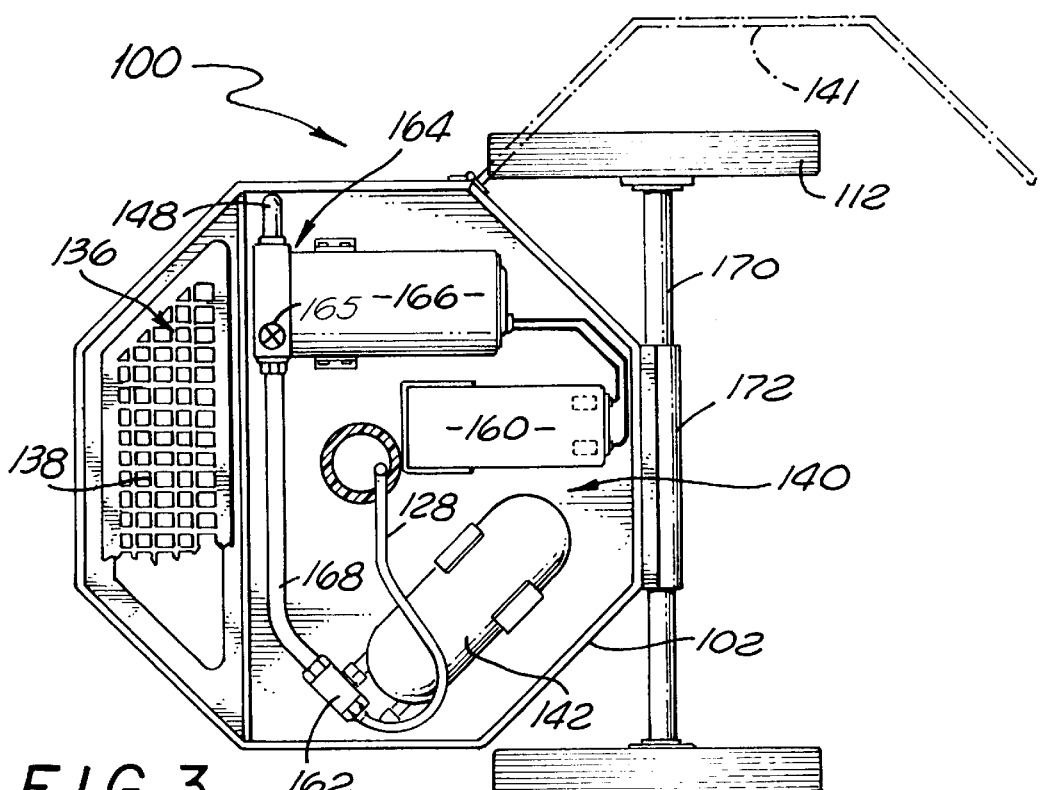
FIG. 3 illustrates a cross-sectional view taken along line 3 of FIG. 2 of a misting device according to the present invention.

FIG. 3 illustrates a cross-sectional view of misting device 100 taken along lines 3 shown in FIG. 2. Water is typically drawn from water compartment 120, through conduit 128, (shown in FIG. 2) to pressure producing device 166. In the embodiment of the present invention described herein pressure producing device 166 is a motorized pump, i.e. a pump operated by a motor. The motorized pump is made available by Shurflow, of Garden Grove, Calif. The motorized pump 166 is powered by battery 160 which may be a 12-volt battery. The motorized pump 166 includes a pressure sensitive switch 165 that switches off the power to the pump when the pressure exceeds a predetermined value. The water is fed from motorized pump 166 via feedline 168 and T-junction 162 to accumulator 142. Accumulator 142 serves as a pressure storage device storing the water at a given pressure. The structure of accumulator 142 is well known in the art, with a bladder which is filled up with water and is compressed by an air chamber. Accumulator 142 may be implemented by a Misty Mate accumulator available from Misty Mate, of Tempe, Ariz. From accumulator 142, via T-junction 162 and conduit 128, water is fed at a given pressure to hose router 130.

FIG. 3 also illustrates cooling compartment 136 with removable grill 138 which serves the purpose of allowing cold water to drip from the ice cubes stored thereabove to cool down the water in the fluid compartment 120 (shown in FIG. 2). Door 141, shown in dotted line, provides lateral access to compartment 140 where the electromechanical parts are located. FIG. 3 also illustrates an axle 170 mounted to base housing 102. Axle 170 has two opposite ends onto which wheels 112 are mounted.

Figure 4:
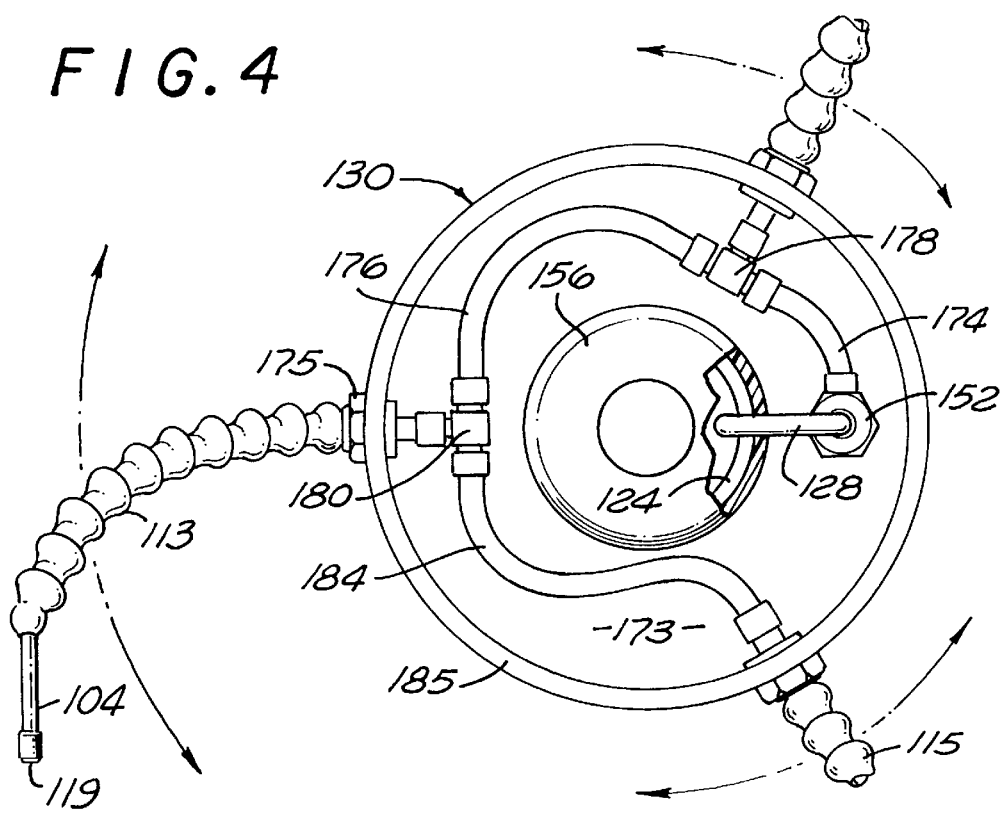
FIG. 4 shows a cross-sectional view of a hose router taken along line 4 of FIG. 2.

FIG. 4 shows a cross-sectional view of hose router 130 taken along lines 4 of FIG. 2. Hose router 130 has a base (bottom surface) 173 onto which a plurality of hoses (174, 176, 184) are routed. Conduit 128, which carries water upwardly from the accumulator (not shown in this figure), is fed to toggle valve 52. When the toggle valve 152 is on, water, pumped up via conduit 128 from the fluid compartment, is fed to a first hose 174 which further carries the water to several T-junctions 178 and 180. The T-junctions are connected via connector 175 to flexible tubes 111, 113 and 115. In the embodiment of the present invention described herein, flexible tubes 111, 113, and 115 may be found on the market under the name "Loc-line multidirectional line" available from Lockwood Products, Inc., of Lake Oswego, Oreg. Hose 184 is routed to a last flexible tube 115. Connectors 175 are installed via holes drilled in lateral walls 185 of the hose router 130. Each flexible tube has a free end to which a nozzle 104 is mounted. Only nozzle 104 mounted to flexible tube 113 is shown in the figure. In the embodiment illustrated in FIG. 4, the holes are drilled at 120° angles to equidistantly distribute the water to be misted around post 124.

Figure 5:
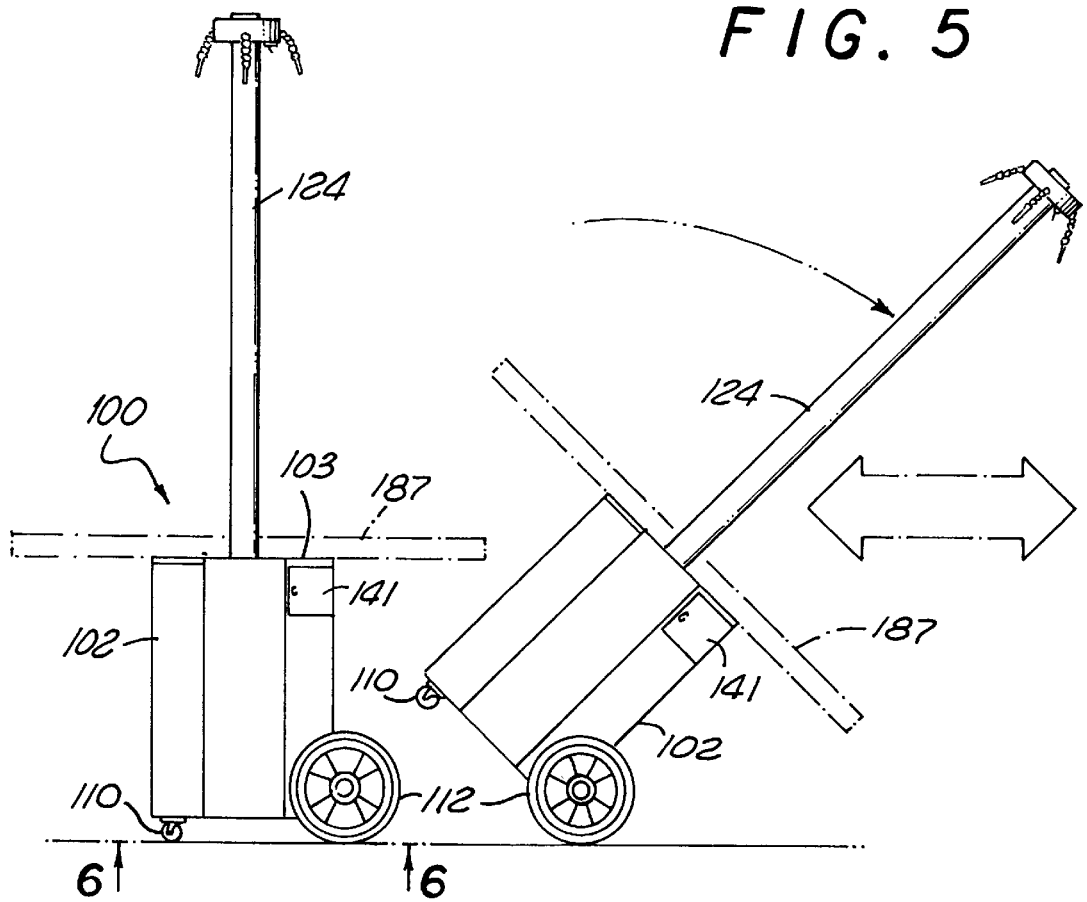
FIG. 5 illustrates a side-elevational view of a misting device according to the present invention.

FIG. 5 illustrates a side-elevational view of misting device 100. Table platform 187, showed in phantom lines, may be mounted onto a top surface 103 of base housing 102. Misting device 100 may be tilted for easier transportation onto wheels 112.

Figure 6:
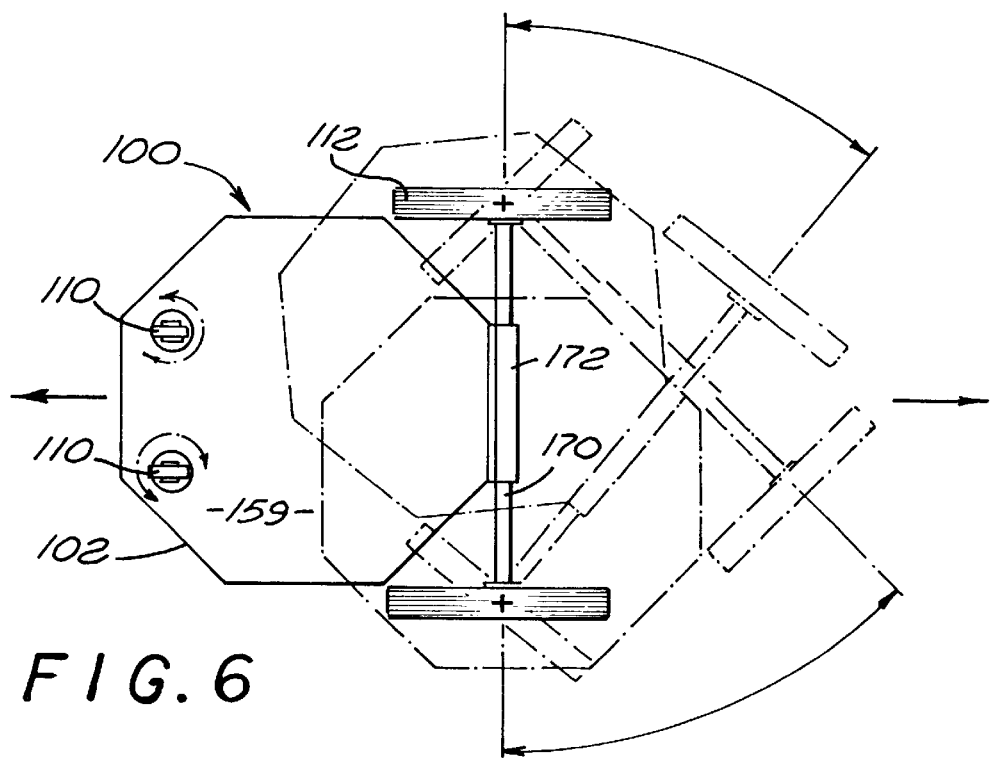
FIG. 6 shows a bottom plan view taken along line 6 of FIG. 5 at the bottom of a misting device according to the present invention.

FIG. 6 shows a bottom plan view of misting device 100 taken along line 6—6, of FIG. 5, at the bottom of misting device 100. Base housing 102 has a bottom surface 159 onto which two swivel casters 110 are mounted. Additionally, a pair of wheels 112 may be mounted at the two ends of axle 170 which is mounted to one of the lateral walls of the octagonally shaped base housing 102. The two wheels 112 are independently rotatable.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

I claim:

1. A misting device comprising:
   at least one nozzle configured to spray a fluid;
   a conduit configured to supply said fluid to said at least one nozzle, said conduit having a first end coupled to said at least one nozzle and a second end; and a base housing including a fluid compartment, configured to store said fluid, said base housing including a cooling compartment adjacent said fluid compartment and configured to cool said fluid, said fluid compartment communicating with said second end of said conduit, said base housing further including a pressure providing device, communicating with said fluid compartment, configured to cause said fluid to flow to said at least one nozzle.

2. The misting device of claim 1 further including an umbrella shaft extending from said base housing, said umbrella shaft having a canopy attached thereto.

3. The misting device of claim 1 wherein said base housing has a top surface configured to mount thereto a table platform.

4. The misting device of claim 1 wherein said base housing includes a compartment where said pressure providing device is placed.

5. The misting device of claim 1 wherein said cooling compartment is adapted to store foods and beverages.

6. The misting device of claim 1 wherein said cooling compartment includes a grill separating said cooling compartment from said fluid compartment.

7. The misting device of claim 1 wherein said pressure providing device includes a pump.

8. The misting device of claim 7 wherein said base housing further includes a battery coupled to said pump.

9. The misting device of claim 7 wherein said base housing further includes an accumulator communicating with said pump and with said conduit, said accumulator storing fluid at a predetermined pressure.

10. The misting device of claim 1 further including transport means, mounted to said base housing, for transporting said misting device.

11. A misting device comprising:

at least one nozzle configured to spray a fluid;

a conduit configured to supply said fluid to said at least one nozzle, said conduit having a first end coupled to said at least one nozzle and a second end;

a base housing including a fluid compartment communicating with said second end of said conduit, said fluid compartment configured to store said fluid, said base housing including a pressure providing device, communicating with said fluid compartment, configured to cause said fluid to flow to said at least one nozzle, said base including a cooling compartment adjacent said fluid compartment to cool said fluid; and a table platform mounted onto said base housing.

12. The misting device of claim 11 further including an umbrella shaft extending from said base housing, said umbrella shaft having a canopy attached thereto.

13. The misting device of claim 11 wherein said pressure providing device includes a pump.

14. The misting device of claim 13 wherein said base housing further includes a battery coupled to said pump.

15. The misting device of claim 13 wherein said pump includes a pressure sensitive switch configured to shut off said pump when a pressure of said fluid exceeds a predetermined value.

16. The misting device of claim 11 wherein said base housing includes an accumulator communicating with said pressure providing device and with said conduit, said accumulator storing fluid at a predetermined pressure.

17. The misting device of claim 11 further including transport means, mounted to said base housing, for transporting said misting device.

\* \* \* \* \*

UNITED STATES PATENT AND TRADEMARK OFFICE
CERTIFICATE OF CORRECTION

Page 1 of 1

PATENT NO. : 5,979,793
DATED : November 9, 1999
INVENTOR(S) : Louis

It is certified that error appears in the above-identified patent and that said Letters Patent is hereby corrected as shown below:

<u>Column 6,</u>
Line 31, please delete "The misting device of claim 11" and insert -- the misting device of claim 1 --

Signed and Sealed this

Nineteenth Day of March, 2002

Attest:

Attesting Officer

JAMES E. ROGAN
Director of the United States Patent and Trademark Office